G. HOFSTATTER.
MILK-COOLER.

No. 177,640. Patented May 23, 1876.

UNITED STATES PATENT OFFICE.

GEORGE HOFSTATTER, OF NEW LONDON, OHIO, ASSIGNOR OF ONE-THIRD HIS RIGHT TO GEORGE A. FOX, OF SAME PLACE, AND ONE-THIRD TO C. V. HEMMINWAY, OF WELLINGTON, OHIO.

IMPROVEMENT IN MILK-COOLERS.

Specification forming part of Letters Patent No. 177,640, dated May 23, 1876; application filed March 21, 1876.

*To all whom it may concern:*

Be it known that I, GEORGE HOFSTATTER, of New London, in the county of Huron and State of Ohio, have invented a new Improvement in Milk-Coolers, of which the following is a specification:

This invention relates to a milk-cooler, and consists of a tank for holding a milk-pan. Said tank is provided with a bottom, divided into peculiar chambers and water-passages, through which cold water is conducted in such a manner that the cold water is evenly distributed throughout the length and breadth of the tank before it passes out, thus causing the milk to be quickly and thoroughly cooled throughout the whole mass.

The invention further consists of a peculiar faucet for graduating and controlling the discharge of the water.

To enable others to fully understand my invention, I proceed to describe the same in detail, with the aid of the accompanying drawing, in which—

Figure 4:
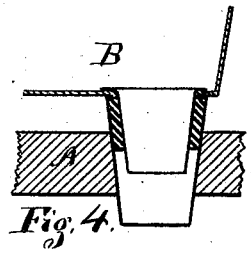
Figure 3:
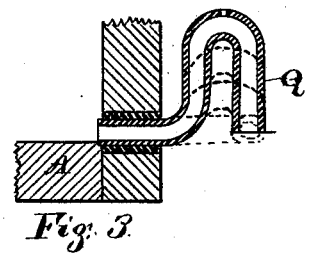
Figure 1:
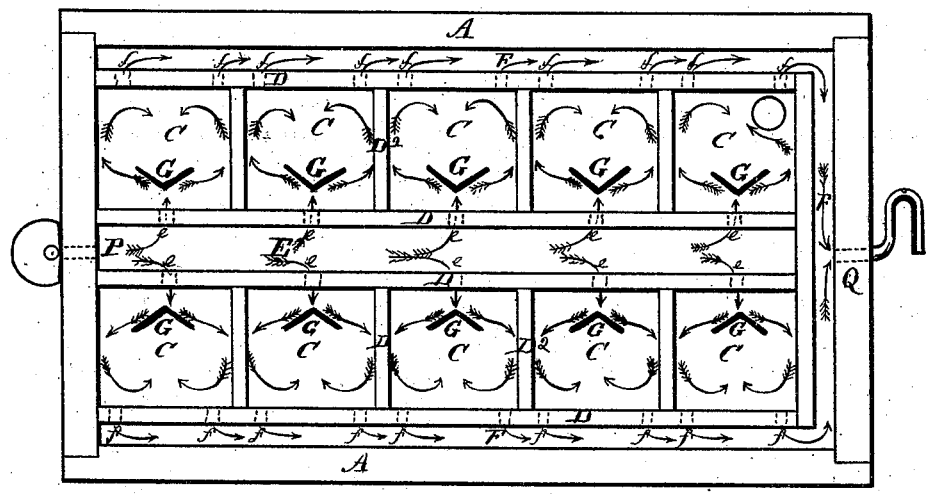
Figure 2:
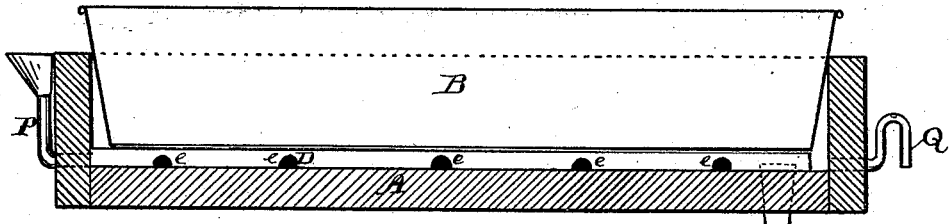

Figure 1 is a top or plan view, having the milk-pan removed, showing the before-mentioned water-passages. Fig. 2 is a longitudinal section in line $x\ x$ of Fig. 1. Fig. 3 is a detached view of the faucet, and Fig. 4 represents the packing-joint of the outlet-pipe from milk-pan.

A represents the tank, and B the milk-pan. The tank may be made of wood or other suitable material. The bottom of said tank is divided into several square chambers or compartments, C C, by low partitions D, in the order shown in Fig. 1, providing a narrow central passage, E, leading from the inlet-pipe P nearly to the other end of the tank. On both sides of said passage are arranged a series of compartments, C C, formed by low cross-partitions $D^2$, and around the sides and across the lower end is a narrow passage, F. The entrances for the water from the central passage E to the chambers C C are openings $e\ e$ at the middle, the water passing in the direction of the arrows. Inside of the chambers C C, and opposite to the said openings $e\ e$, are placed angular pieces G G, which intercept the currents of water and divert them to the sides of the chambers, where they are again deflected, and form eddies in the center of the chambers, by which means the inflowing cold water is equally distributed in the several compartments underneath the milk-pan. The water passes from the chambers C C, out through openings $f\ f$ near the corners, into the outside passage F, and flows on down to the end and out at the outlet Q.

At the outlet Q I place a pipe bent in the form of a siphon, fitted into the tank with a suitable joint or packing to prevent leakage, by means of which the discharge of the water may be regulated, controlled, or cut off entirely. This is done by turning the pipe in the different positions seen in dotted lines, Fig. 3.

When it lies horizontal, the water will flow with full force. If it is desired to check the flow, it is turned upward. If it is desired to stop the flow, it is turned up into a perpendicular position, which brings the bow of the pipe above the level of the water in the tank, and, there being a small hole in the bow, the siphon does not continue to flow.

In Fig. 4 is shown a rubber ring or packing on the pipe from the bottom of the milk-pan into the milk-discharge pipe in the bottom of the tank. This makes a very efficient and perfect milk-cooler.

Having thus described my invention, I claim—

In a milk-cooler, the water-tank A, having a central passage, E, flanked by the chambers C C, and connected therewith by apertures $e\ e$, said chambers having angular projections G G, for diverting the course of the water, as described, having the outside passage F connected with the chambers C C by apertures $f\ f$, leading to the discharge Q, as shown and described.

GEORGE HOFSTATTER.

Witnesses:
 ROLLIN C. POWERS,
 ALBERT A. POWERS.